(12) United States Patent
Bhandar et al.

(10) Patent No.: US 8,176,412 B2
(45) Date of Patent: May 8, 2012

(54) GENERATING FORMATTED DOCUMENTS

(75) Inventors: Manisha D. Bhandar, New York, NY (US); Pietro Mazzoleni, New York, NY (US); Debdoot Mukherjee, Kolkata (IN); Vinay K. Reddy, Bangalore (IN); Vibha Singhal Sinha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/547,169

(22) Filed: Aug. 25, 2009

(65) Prior Publication Data

US 2011/0055687 A1 Mar. 3, 2011

(51) Int. Cl.
G06F 17/00 (2006.01)
(52) U.S. Cl. ...................................................... 715/235
(58) Field of Classification Search .................. 715/234, 715/235, 236, 237, 239, 243
See application file for complete search history.

(56) References Cited

U.S. PATENT DOCUMENTS

| | | | |
|---|---|---|---|
| 4,498,147 A * | 2/1985 | Agnew et al. .................. | 715/236 |
| 5,267,155 A | 11/1993 | Buchanan et al. | |
| 5,345,551 A * | 9/1994 | Shelley et al. ................. | 715/804 |
| 5,655,130 A | 8/1997 | Dodge et al. | |
| 5,692,206 A | 11/1997 | Shirley et al. | |
| 5,717,945 A * | 2/1998 | Tamura .......................... | 715/235 |
| 5,987,480 A | 11/1999 | Donohue et al. | |
| 6,006,242 A | 12/1999 | Poole et al. | |
| 6,029,182 A * | 2/2000 | Nehab et al. ................... | 715/205 |
| 6,212,530 B1 | 4/2001 | Kadlec | |
| 6,928,610 B2 | 8/2005 | Brintzenhofe et al. | |
| 7,039,863 B1 | 5/2006 | Caro et al. | |
| 7,111,233 B1 * | 9/2006 | Ballantyne et al. ............ | 715/215 |
| 7,260,584 B2 | 8/2007 | Hailey et al. | |
| 7,302,634 B2 | 11/2007 | Lucovsky et al. | |
| 7,363,579 B2 | 4/2008 | Vasey | |
| 7,546,527 B2 * | 6/2009 | Dames et al. .................. | 715/239 |
| 7,721,193 B2 * | 5/2010 | Upton ............................ | 715/234 |
| 2001/0051962 A1 * | 12/2001 | Plotkin ......................... | 707/522 |
| 2003/0115545 A1 * | 6/2003 | Hull et al. ...................... | 715/500 |
| 2005/0210057 A1 * | 9/2005 | Sprague et al. ............... | 707/101 |
| 2006/0156224 A1 * | 7/2006 | Sulistio et al. ................ | 715/513 |
| 2006/0271843 A1 * | 11/2006 | Yarde et al. .................... | 715/513 |
| 2007/0157083 A1 | 7/2007 | Roy et al. | |
| 2007/0283246 A1 * | 12/2007 | Wake et al. .................... | 715/513 |
| 2008/0082959 A1 * | 4/2008 | Fowler .......................... | 717/104 |

FOREIGN PATENT DOCUMENTS

WO WO 2005/116864 12/2005

OTHER PUBLICATIONS

Fraternali, Piero, et al, "Model-driven Development of Web Applications: The AutoWeb System", Transactions on Information Systems (TOIS), vol. 18, Issue 4, Oct. 2000, pp. 323-382.*

Zhang et al., SOMA-ME: A platform for model-driven design of SOA solutions, IBM Systems Journal, vol. 47, No. 3, 2008.

* cited by examiner

Primary Examiner — Laurie Ries
(74) Attorney, Agent, or Firm — Ryan, Mason & Lewis, LLP

(57) ABSTRACT

Techniques for generating one or more formatted documents are provided. The techniques include receiving content from one or more data sources, enabling specification of one or more formatting elements to be used in one or more generated formatted documents, enabling specification of a structure to be used in the one or more generated formatted documents, enabling specification of a style of the one or more formatting elements to be used in the one or more generated formatted documents, and generating one or more formatted documents based on the specifications.

17 Claims, 7 Drawing Sheets

GENERATING FORMATTED DOCUMENTS

FIELD OF THE INVENTION

Embodiments of the invention generally relate to information technology, and, more particularly, to document generation.

BACKGROUND OF THE INVENTION

In software projects, stakeholders produce a lot of documents (for example, excel, word, power-point, etc.), especially in the early phases of the software development life cycle (SDLC). These can include, for example, project scoping, planning, requirements, etc. Additionally, stakeholders often prefer documents because they are easy to share with customers and take approvals, easy to read through and create a printable and/or recordable copy, and can be accessed from anywhere (Office tooling is ubiquitous).

However, information embedded in documents is difficult to reuse, and can include duplication of information across documents. Also, maintaining traceability is difficult and ensuring compliance to a common vocabulary is difficult as well. There is increased shift towards providing tools to stakeholders to capture the information they would have otherwise entered in documents in a model or structured format, however, there exists a need to produce similar documents to continue normal practices.

SUMMARY OF THE INVENTION

Principles and embodiments of the invention provide techniques for generating formatted documents. An exemplary method (which may be computer-implemented) for generating one or more formatted documents, according to one aspect of the invention, can include steps of receiving content from one or more data sources, enabling specification of one or more formatting elements to be used in one or more generated formatted documents, enabling specification of a structure to be used in the one or more generated formatted documents, enabling specification of a style of the one or more formatting elements to be used in the one or more generated formatted documents, and generating one or more formatted documents based on the specifications.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
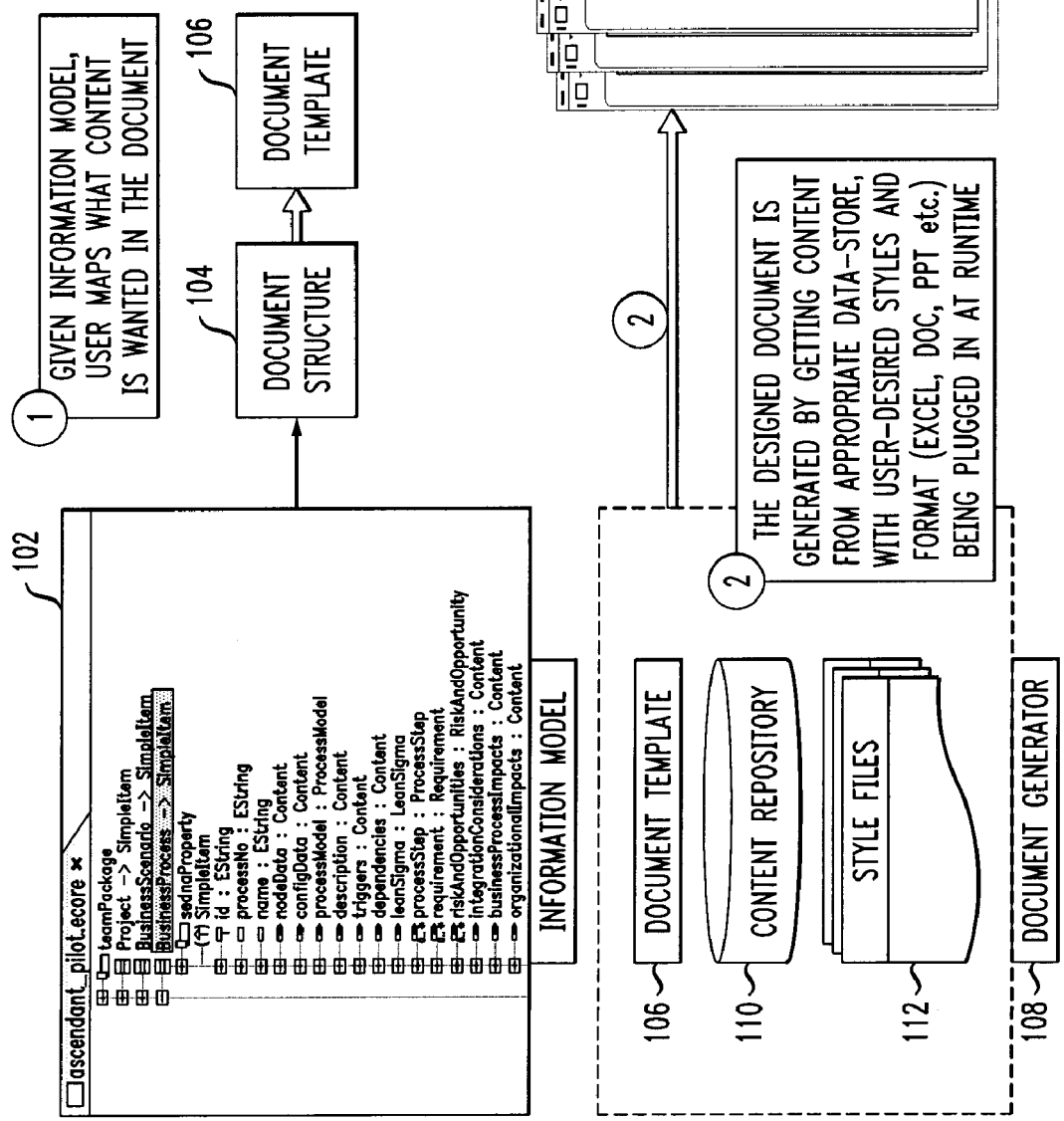
FIG. 1 is a diagram illustrating techniques for generating formatted documents, according to an embodiment of the present invention.

Principles of the invention include generating formatted documents from structured data sources. The techniques described herein include generating documents with appropriate content and styling irrespective of the underlying information model and tool used to capture the data. As detailed herein, a document generator, which takes as input the information model, can automatically generate the requisite documents. A user can configure what information entities need to be put in the document, styles to use and the output format desired.

One or more embodiments of the invention also include enabling users to design the content type and styles required in a document as a template, as well as auto-generating the document in appropriate format by pulling content from different sources. At run-time, the content can be pulled from the tool of choice and the document can be generated with a desired look and feel.

The techniques described herein include creating multiple formats of a document (without being tied up to a specific format), as well as providing support for flexible styling and formatting. Also, one or more embodiments of the invention include providing support of a model that captures properties of data elements (and relationships among data elements) to provide automatic inference of formatting decisions, as well as enabling the capability to construct the structure and content of the entire document (designing a template) rather than a small portion within a standard document.

As detailed herein, one or more embodiments of the invention can facilitate a user seeing the information and relationships between contents of the document to decide how the document should be structured and, depending on the project, applying appropriate styles to finalize the look of the document. Additionally, the techniques described herein include creating document-based printable deliverables that are produced as part of blueprinting, as well as generating documents that are required to be produced at the end of blueprinting cycle.

In one or more embodiments of the invention, document design and generation can include the content model, style model and formatting model each being taken as inputs. A user can design a generic document structure (referred to herein as a document template) using the content model and formatting elements available. At run-time, the user can configure content source to use, styles to apply and document output format needed (for example, Word document, PowerPoint, Excel, etc.) and one or more embodiments of the invention generates the requisite document.

As detailed herein, different content types have a richer semantic and structural relationship with each other. One or more embodiments of the invention allow a user to see the relationships between different content types and then recommend the appropriate formatting element that should be chosen to render that content type. Also, one or more embodiments of the invention can enable consultants to feed design elements into a database, from where it is possible to effectively search and reuse information in future engagements.

As described herein, a document generator can be used to produce document-based deliverables from the information stored in any tool as per some defined information model. Users (for example, consultants) can flexibly design the document in terms of content as well as appearance (that is, specify what part of the document should contain what data from the model and what formatting the document needs). A variety of formatting elements such as, for example, table, list, and paragraph can be supported, and a user can additionally specify what document format should be generated (for example, Word, Excel, hypertext markup language (HTML)) and style guide to use. A style guide is a sample document which defines the styles (that is, font, alignment, etc.) of the different formatting elements that are supported.

In one or more embodiments of the invention, a specification can be stored in extensible markup language (XML) format and used at the document generation time to query for requisite services and generate the document. The design specification can be, for example, generic with no dependency on any particular document type. As such, it is possible to create work product in new formats by plugging-in appropriate transformers and style-guides. Also, one or more embodiments of the invention can automatically infer what formatting elements should be used for a piece of content corresponding to the elements of the information model, and provide guidance to user in creating the document design.

Automatic generation of documents can require information about the document layout, the source of the data for each part of the document, the schema followed by this data and the mechanism to extract it. In order to produce formatted documents, one also needs to know the styles to apply in addition to all of the above.

FIG. 1 is a diagram illustrating techniques for generating formatted documents, according to an embodiment of the present invention. By way of illustration, FIG. 1 depicts an information model 102, which can be used to provide input to a document structure 104, which is used to create a document template 106. Given an information model 102, a user can map the content that is desired into the document.

Also, FIG. 1 depicts a document generator 108, which includes the document template 106, a content repository 110 and style files 112. The document generator 108 is used to create generated documents 114. A designed document is generated by receiving content from appropriate data-store, with user-desired styles and format (for example, Excel, Word, PowerPoint, etc.) being plugged-in at run-time.

Figure 2:
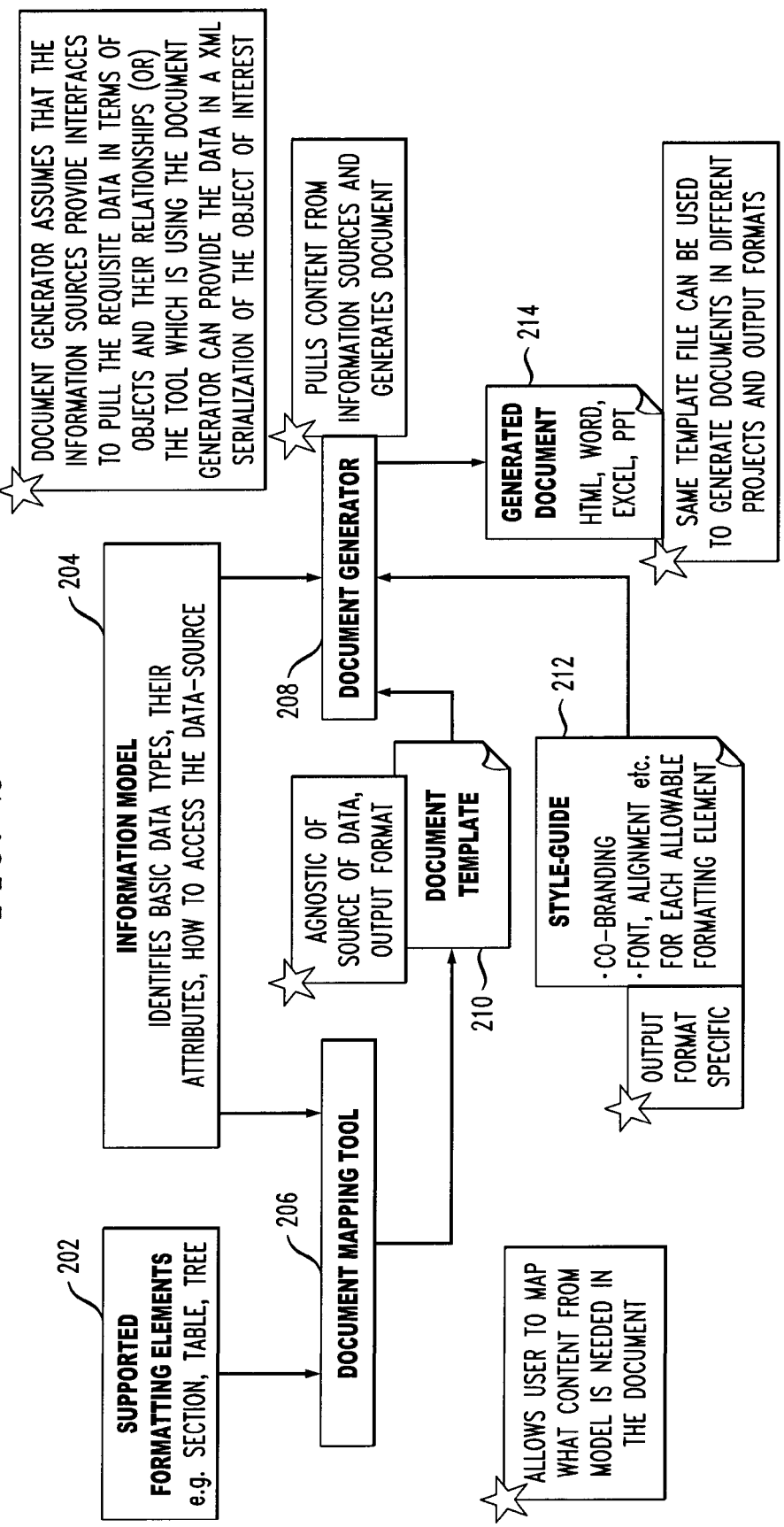
FIG. 2 is a diagram illustrating componentry for generating formatted documents, according to an embodiment of the present invention.

FIG. 2 is a diagram illustrating componentry for generating formatted documents, according to an embodiment of the present invention. By way of illustration, FIG. 2 depicts supported formatting elements 202 (for example, section, table, tree, etc.), which are provided as input to document mapping tool module 206. Also, information model 204 provides input to document mapping tool module 206 as well as document generator module 208. Information model 204 can identify basic data types, their attributes, and how to access the datasource.

As also depicted in FIG. 2, the document mapping tool module 206 provides input to a document template 210, which allows a user to map what content from a model is needed in the document. The document template 210 can also be uncertain of source of data, output format, etc. Additionally, the document template 210, as well as a style-guide 212, provide input to the document generator module 208. A style-guide component 212 can include, for example, co-branding, as well as font, alignment, etc. for each allowable formatting element, and can also be output format specific.

Additionally, the document generator module 208 pulls content from information sources and creates a generated document 214 (for example, in HTML, Word, Excel, PowerPoint, etc.). The document generator module 208 can assume that the information sources provide interfaces to pull the requisite data in terms of objects and their relationships. Also, the tool which is using the document generator module 208 can also provide the data in an XML serialization of the object of interest. Additionally, the same template file can be used to generate documents in different projects and output formats.

As described herein, one or more embodiments of the invention can include two major modules, namely a mapping tool module and a document generator module (as depicted, for example, in FIG. 2). The mapping tool helps create the document template that specifies the various sections in the document, the elements in the information model to be pulled in, and the kind of formatting (table, list, paragraph, etc.) to be rendered to each data element. The document generator takes the document template as input, extracts data from a repository for every element in the template, binds it in the formatting elements as mentioned in the template, and then plugs-in styles specific to the file format (Word, HTML, etc.).

Figure 3A:
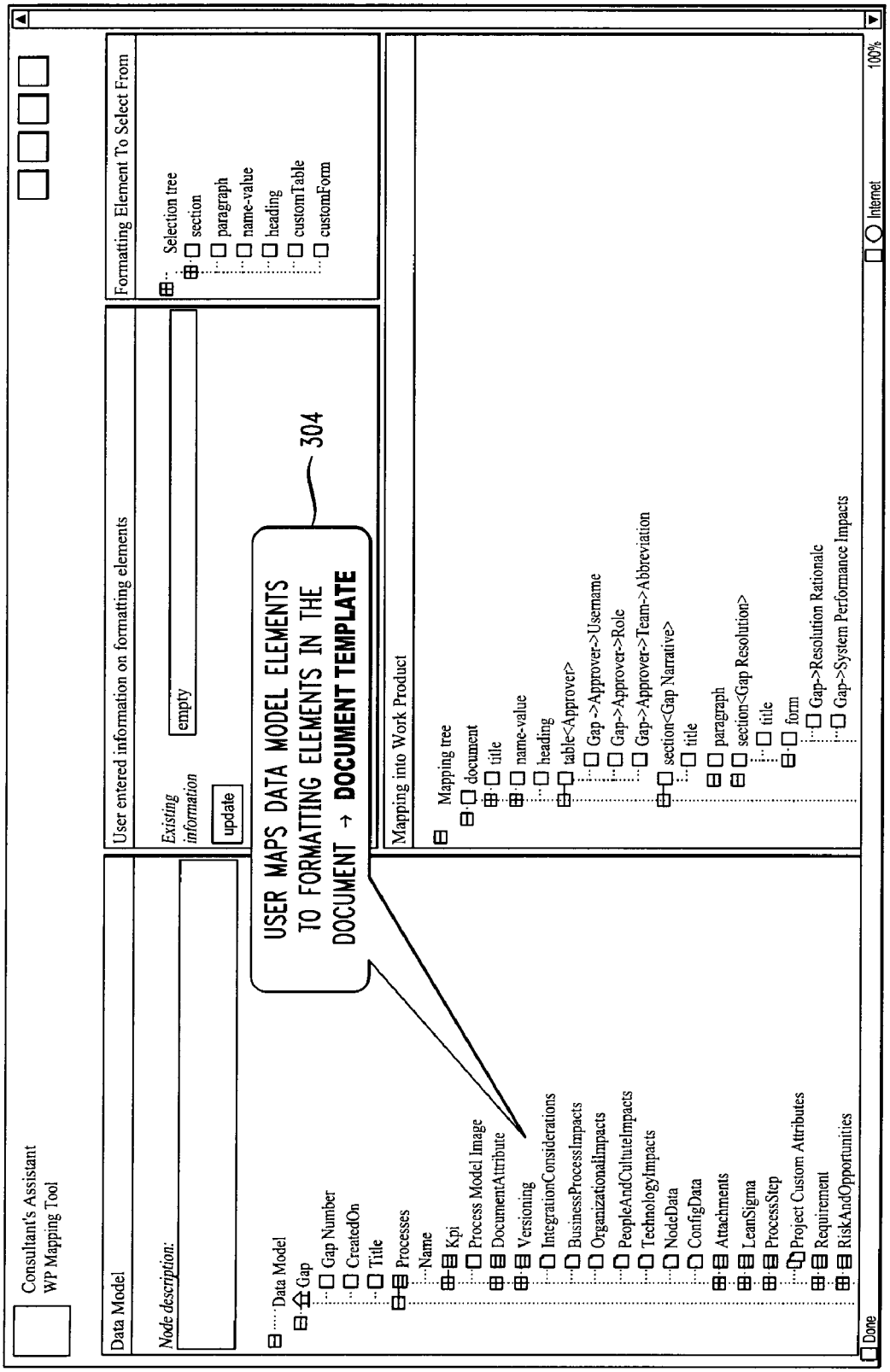
FIG. 3A is a diagram illustrating steps in document creation, according to an embodiment of the present invention.

FIG. 3A is a diagram illustrating steps in document creation, according to an embodiment of the present invention. By way of illustration, FIG. 3A depicts leveraging information about structural relationships between content to provide guidance on how the content should be rendered in the document. Additionally, as depicted by FIG. 3A, a business process can be linked to more than one process step which in turn contain multiple attributes. Also, a table can be the most appropriate formatting element to use to show process details in a document which describes the business process.

FIG. 3A also depicts step 304, which includes a user mapping data elements to formatting elements in the document to create a document template (for example, deciding what data goes where, and in what format). This step can be performed manually or inferred based on relationships in the data model.

Figure 3B:
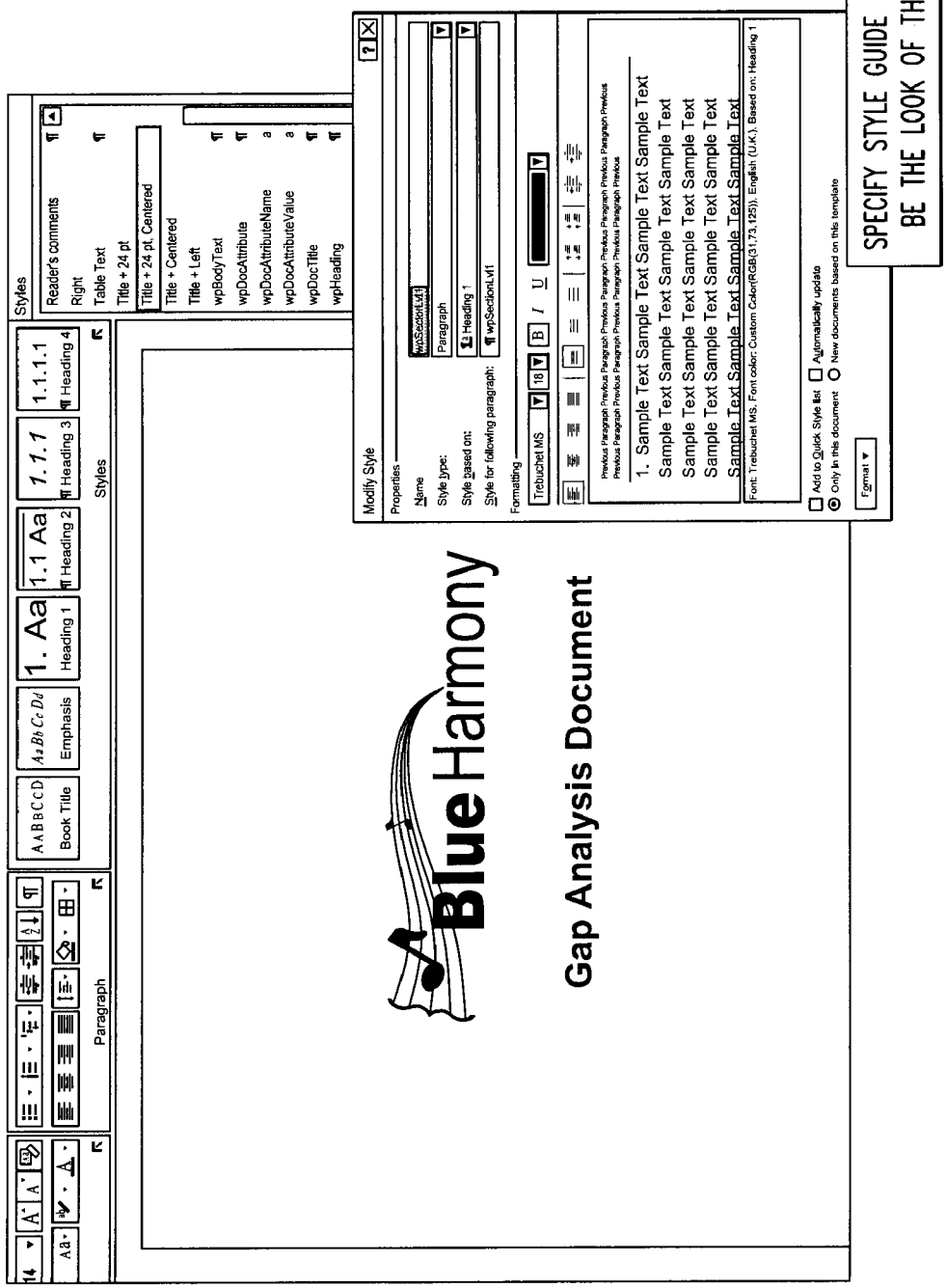
FIG. 3B is a diagram illustrating steps in document creation, according to an embodiment of the invention.

FIG. 3B is a diagram illustrating steps in document creation, according to an embodiment of the present invention. By way of illustration, FIG. 3B depicts step 306, which includes specifying a style guide, that is, what the look of the document will be (which can include, for example, modifying a style-sheet).

Figure 3C:
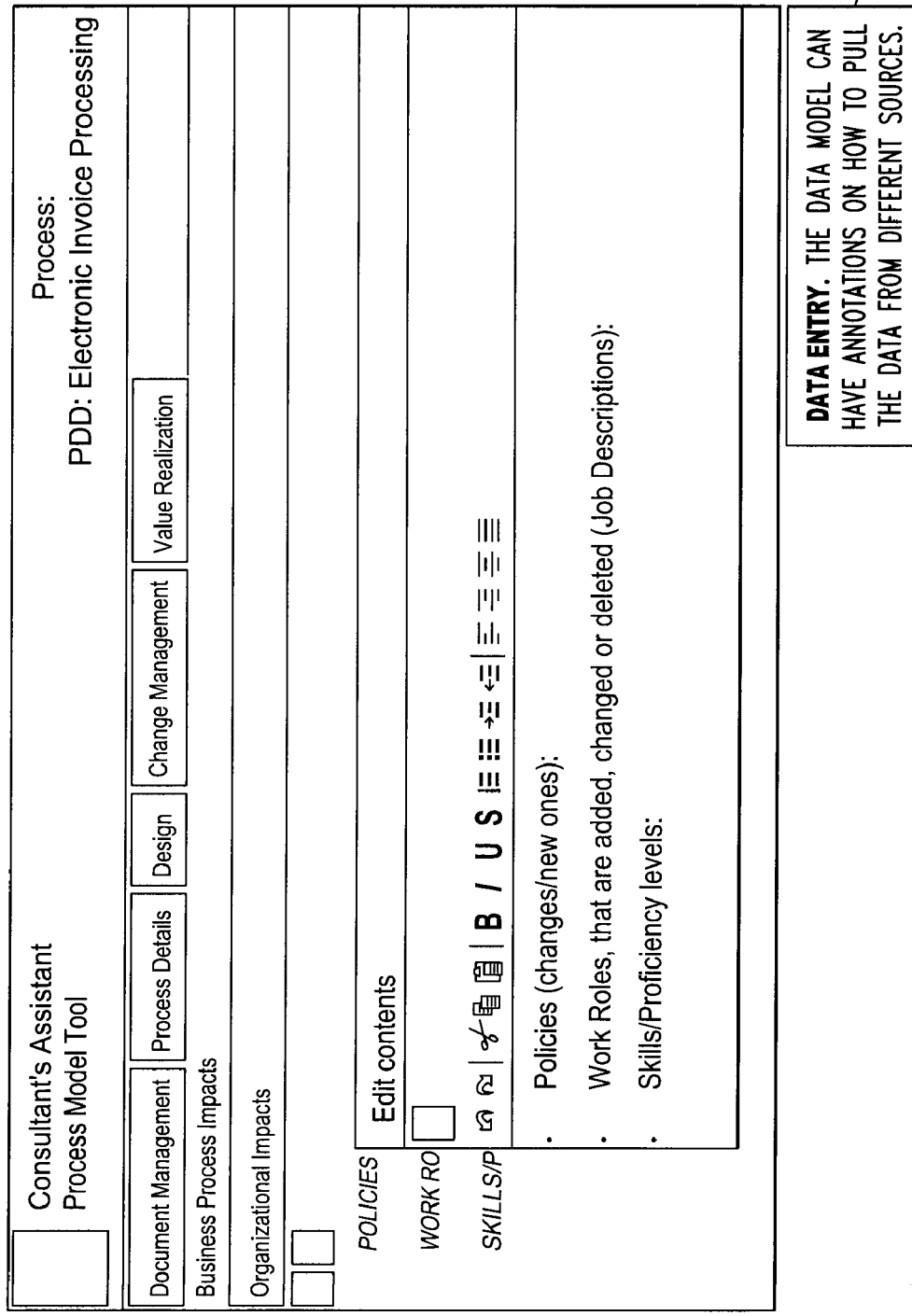
FIG. 3C is a diagram illustrating steps in document creation, according to an embodiment of the invention.

FIG. 3C is a diagram illustrating steps in document creation, according to an embodiment of the present invention. FIG. 3C depicts step 308, which includes entering data (for example, via a user) using a consultant assistant. In one or more embodiments of the invention, a data model has annotations on how to pull data from different sources.

Figure 3D:
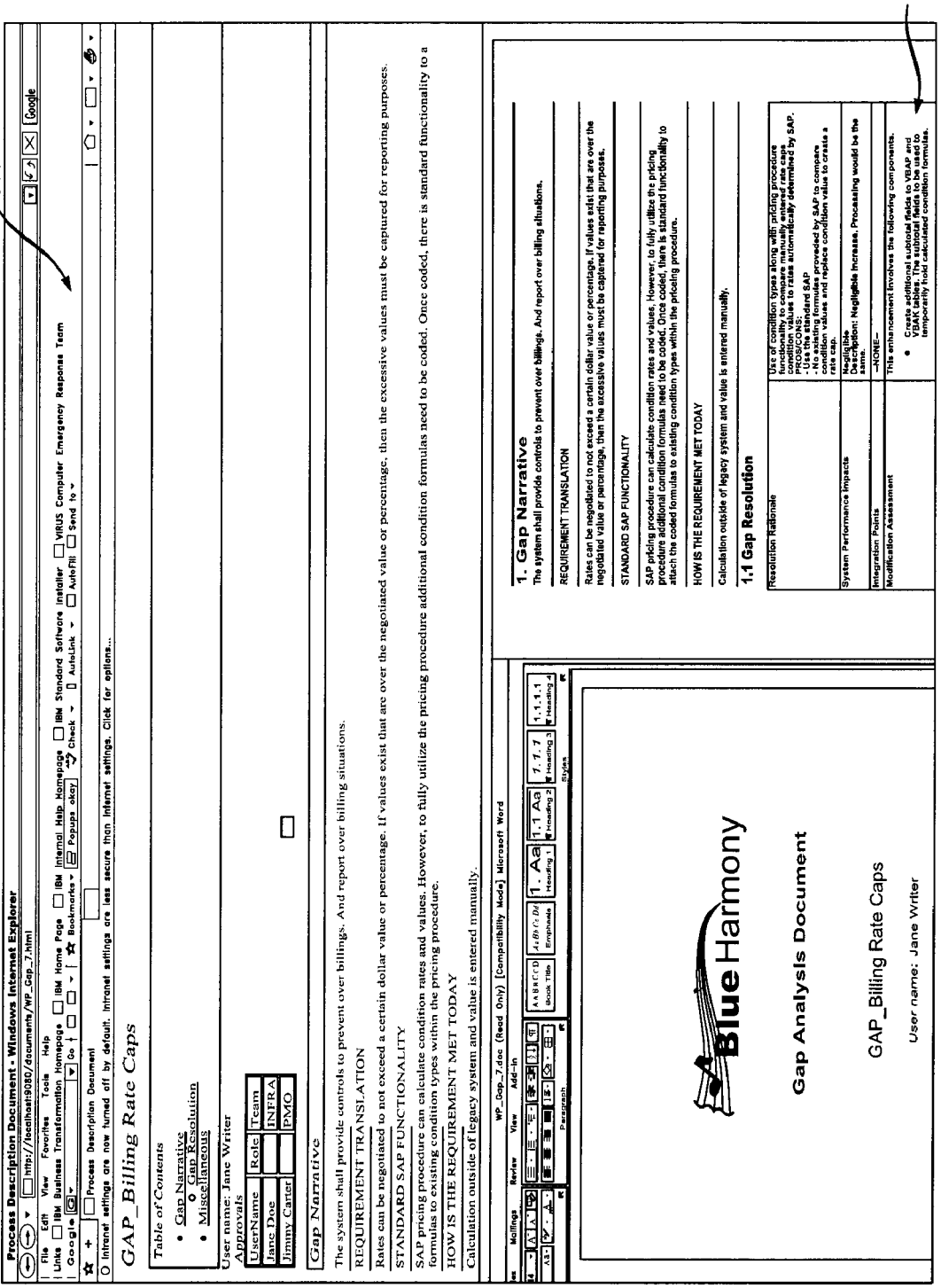
FIG. 3D is a diagram illustrating creation of printable documents, according to an embodiment of the present invention.

FIG. 3D is a diagram illustrating creation of printable documents, according to an embodiment of the present invention. By way of illustration, FIG. 3D depicts a printable document 310 in HTML format, as well as a printable document 312 in Microsoft Word format, created using the techniques detailed in FIGS. 3A 3B and 3C, as well as described elsewhere herein.

In one or more embodiments of the invention, the mapping tool can be a manifested in an easily navigable user interface (see, for example, FIG. 3A), where it is possible to browse the schemas of the data source(s), design the document layout as a hierarchy of sections and sub-sections with paragraphs, tables, lists and images (the list of formatting elements is also configurable since it is provided as an input to the mapping file) inserted wherever required and attach each of these to elements in the data source(s). In the mapping tool, a user can select and load the schema for the data source(s) from which he or she wants to pull out content.

Also, a user can incrementally build the layout for the document, adding sections and dropping content onto them from the elements in the loaded information model. The techniques described herein can support any representation of a schema. Loading of information model in the mapping tool can include parsing the schema and rendering it as a tree with user-friendly annotations to the nodes. Additionally, the formatting elements supported by the document generator can also be loaded in the formatting element section of the mapping tool through a schema file. This schema gives the set of formatting elements that may be used in the generated documents.

The document template produced by the mapping tool can also be, for example, an XML file depicting the structure of document and the hierarchy of sections, tables, paragraphs, lists, etc. within it. The document template also contains references to the data sources for each document part and/or the data itself if it is to be a part of the template.

During the mapping process, one or more embodiments of the invention can automatically infer the formatting element that would best represent the content by studying the multiplicity of information model elements. For example, if an element has a multiplicity 'n' with multiple attributes or child elements, it may be best formatted as a table. Also, structural relationships between elements may provide hints regarding their order of appearance in the work-product. For example, nested elements in the information model may potentially be contained in nested sections in the document.

In one or more embodiments of the invention, the information model can be extended with annotations to be used by the mapping tool in order to display it in an efficient manner. A user can load the information model into the mapping tool and decide on what data goes where and in what format. Also, the user can prepare a style guide per the format he or she wants to generate. Further, after the user has entered data into the data sources using a model based data entry tool, he or she can generate printable work-products in any of the supported formats.

The document generator can pull out data using the references present in the document template and replace the references with actual data. Also, in one or more embodiments of the invention, the process of extracting requisite data from the source(s) can be automated by techniques such as reflection (to determine objects to be loaded at runtime) if data is obtained in the form of objects and/or tuning the querying capabilities supported by the data source. Additionally, the XML file (which may now contain data for a particular instance of work-product) can be converted to the desired format using extensible stylesheet language transformations (XSLT) and macros written for each supported format. The styles per formatting element and/or information regarding header, footer, title page, etc. can be externalized from document generation and can also be plugged-in at this stage.

Figure 4:
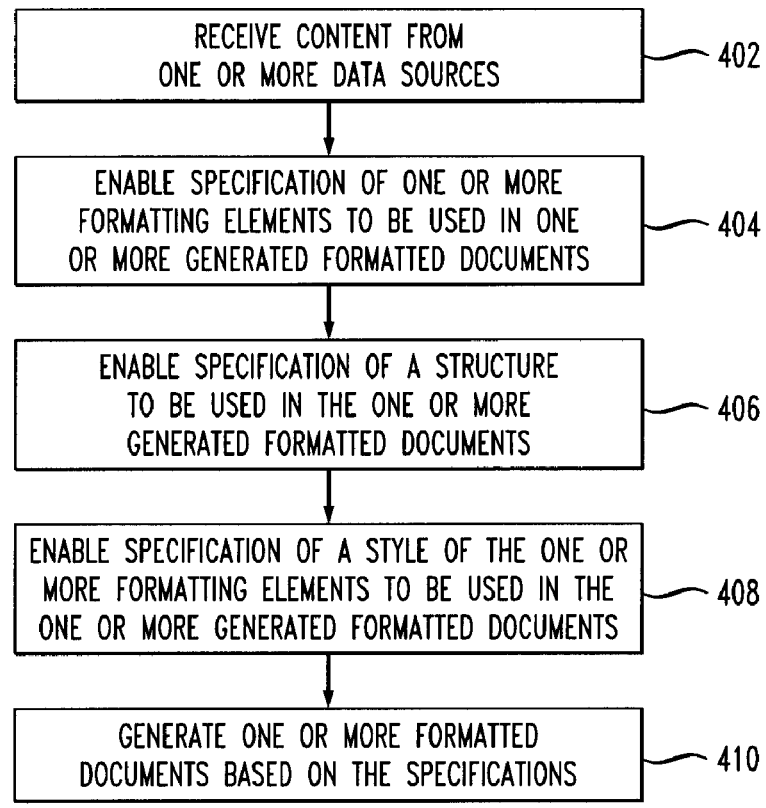
FIG. 4 is a flow diagram illustrating techniques for generating one or more formatted documents, according to an embodiment of the invention.

FIG. 4 is a flow diagram illustrating techniques for generating one or more formatted documents (for example, Microsoft Word, Microsoft Excel, HTML, portable document format (PDF)), according to an embodiment of the present invention. Step 402 includes receiving content from one or more data sources. Receiving content from data sources can include receiving content from data sources built according to a schema represented in a parsable format. Step 404 includes enabling specification (for example, by a user) of one or more formatting elements (for example, table, list, viewlet, paragraph, etc.) to be used in one or more generated formatted documents.

Step 406 includes enabling specification of a structure to be used in the one or more generated formatted documents. Enabling specification of a structure to be used in the generated formatted documents can include, for example, using a graphical user interface (GUI) to determine where a data model element will appear within a document and how the document will be formatted. Also, enabling specification of a structure can include determining the formatting element used to render a document.

Step 408 includes enabling specification of a style of the one or more formatting elements to be used in the one or more generated formatted documents. Enabling specification of a style of the formatting elements to be used in the generated formatted documents can include using a style guide. Step 410 includes generating one or more formatted documents (for example, printable formatted documents) based on the specifications.

The techniques depicted in FIG. 4 can also include generating a template used to generate one or more formatted documents. Generating a template used to generate formatted documents can include, for example, automatically determining a formatting element used to render each data model element from information hidden in a schema; (for example, multiplicity, type, etc.), inferring a position of each data model element and establishing an order of sections in a document, and reverse-engineering styles of formatting elements from existing documents. Establishing an order of sections in a document includes studying containment relationships in the schema.

The techniques depicted in FIG. 4 can also, as described herein, be run on a system, wherein the system includes distinct software modules, each of the distinct software modules being embodied on a tangible computer-readable recordable storage medium. The distinct software modules can include, for example, a document mapping tool module and a document generator module executing on a hardware processor.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 5:
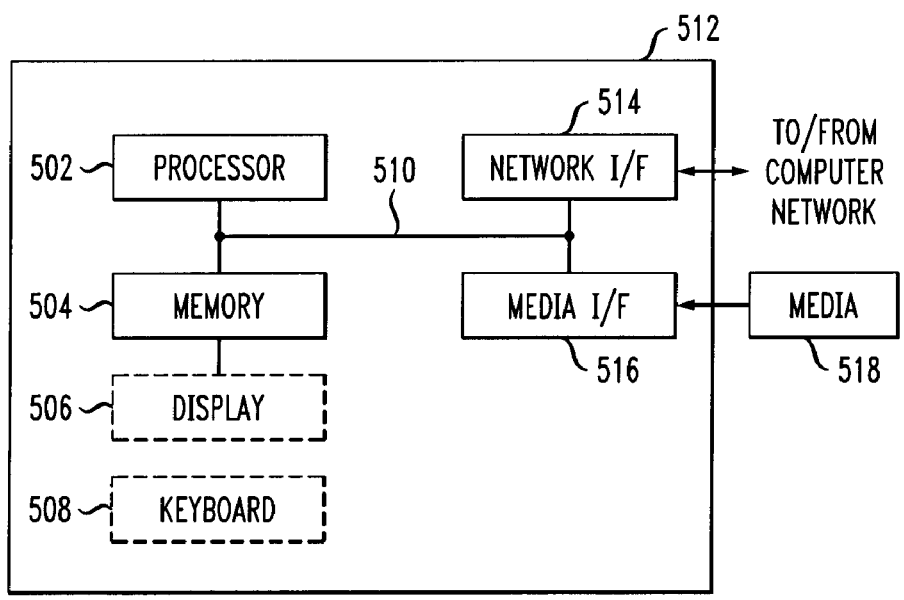
FIG. 5 is a system diagram of an exemplary computer system on which at least one embodiment of the invention can be implemented.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or implementing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, creating multiple formats of a document (without being tied up to a specific format), as well as providing support for flexible styling and formatting.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for generating one or more formatted documents, wherein the method comprises:
   receiving content from one or more data sources;
   enabling specification of one or more formatting elements to be used in one or more generated formatted documents;
   enabling specification of a structure to be used in the one or more generated formatted documents;
   enabling specification of a style of the one or more formatting elements to be used in the one or more generated formatted documents; and
   generating a template used to generate one or more formatted documents based on the specifications, wherein generating a template comprises automatically determining a formatting element used to render each data model element from information hidden in a schema from the received content and reverse-engineering one or more styles of one or more formatting elements from existing documents.

2. The method of claim 1, wherein generating a template used to generate one or more formatted documents comprises:

inferring a position of each data model element and establishing an order of one or more sections in a document.

3. The method of claim 2, wherein establishing an order of one or more sections in a document comprises studying one or more containment relationships in the schema.

4. The method of claim 1, wherein receiving content from one or more data sources comprises receiving content from one or more data sources built according to a schema represented in a parsable format.

5. The method of claim 1, wherein enabling specification of a structure to be used in the one or more generated formatted documents comprises using a graphical user interface (GUI) to determine where a data model element will appear within a document and how the document will be formatted.

6. The method of claim 5, wherein enabling specification of a structure to be used in the one or more generated formatted documents comprises determining the formatting element used to render a document.

7. The method of claim 1, wherein enabling specification of a style of the one or more formatting elements to be used in the one or more generated formatted documents comprises using a style guide.

8. The method of claim 1, wherein generating one or more formatted documents based on the specifications comprises generating one or more printable formatted documents based on the specifications.

9. The method of claim 1, further comprising providing a system, wherein the system comprises one or more distinct software modules, each of the one or more distinct software modules being embodied on a tangible computer-readable recordable storage medium, and wherein the one or more distinct software modules comprise a document mapping tool module and a document generator module executing on a hardware processor.

10. A computer program product comprising a tangible computer readable recordable storage medium including computer useable program code for generating one or more formatted documents, the computer program product including:

computer useable program code for receiving content from one or more data sources;

computer useable program code for enabling specification of one or more formatting elements to be used in one or more generated formatted documents;

computer useable program code for enabling specification of a structure to be used in the one or more generated formatted documents;

computer useable program code for enabling specification of a style of the one or more formatting elements to be used in the one or more generated formatted documents; and computer useable program code for generating a template used to generate one or more formatted documents based on the specifications, wherein generating a template comprises automatically determining a formatting element used to render each data model element from information hidden in a schema from the received content and reverse-engineering one or more styles of one or more formatting elements from existing documents.

11. The computer program product of claim 10, wherein the computer useable program code for generating a template used to generate one or more formatted documents comprises:

computer useable program code for inferring a position of each data model element and establishing an order of one or more sections in a document.

12. The computer program product of claim 10, wherein the computer useable program code for enabling specification of a structure to be used in the one or more generated formatted documents comprises computer useable program code for using a graphical user interface (GUI) to determine where a data model element will appear within a document and how the document will be formatted.

13. The computer program product of claim 10, wherein the computer useable program code comprises one or more distinct software modules, and wherein the one or more distinct software modules comprise a document mapping tool module and a document generator module executing on a hardware processor.

14. A system for generating one or more formatted documents, comprising:

a memory; and at least one processor coupled to the memory and operative to:

receive content from one or more data sources;

enable specification of one or more formatting elements to be used in one or more generated formatted documents;

enable specification of a structure to be used in the one or more generated formatted documents;

enable specification of a style of the one or more formatting elements to be used in the one or more generated formatted documents; and generate a template used to generate one or more formatted documents based on the specifications, wherein generating a template comprises automatically determining a formatting element used to render each data model element from information hidden in a schema from the received content and reverse-engineering one or more styles of one or more formatting elements from existing documents.

15. The system of claim 14, wherein the at least one processor coupled to the memory operative to generate a template used to generate one or more formatted documents is further operative to:

infer a position of each data model element and establishing an order of one or more sections in a document.

16. The system of claim 14, wherein the at least one processor coupled to the memory operative to enable specification of a structure to be used in the one or more generated formatted documents is further operative to use a graphical user interface (GUI) to determine where a data model element will appear within a document and how the document will be formatted.

17. The system of claim 14, further comprising a tangible computer-readable recordable storage medium having one or more distinct software modules embodied thereon, the one or more distinct software modules comprising a document mapping tool module and a document generator module executing on a hardware processor.

* * * * *